UNITED STATES PATENT OFFICE.

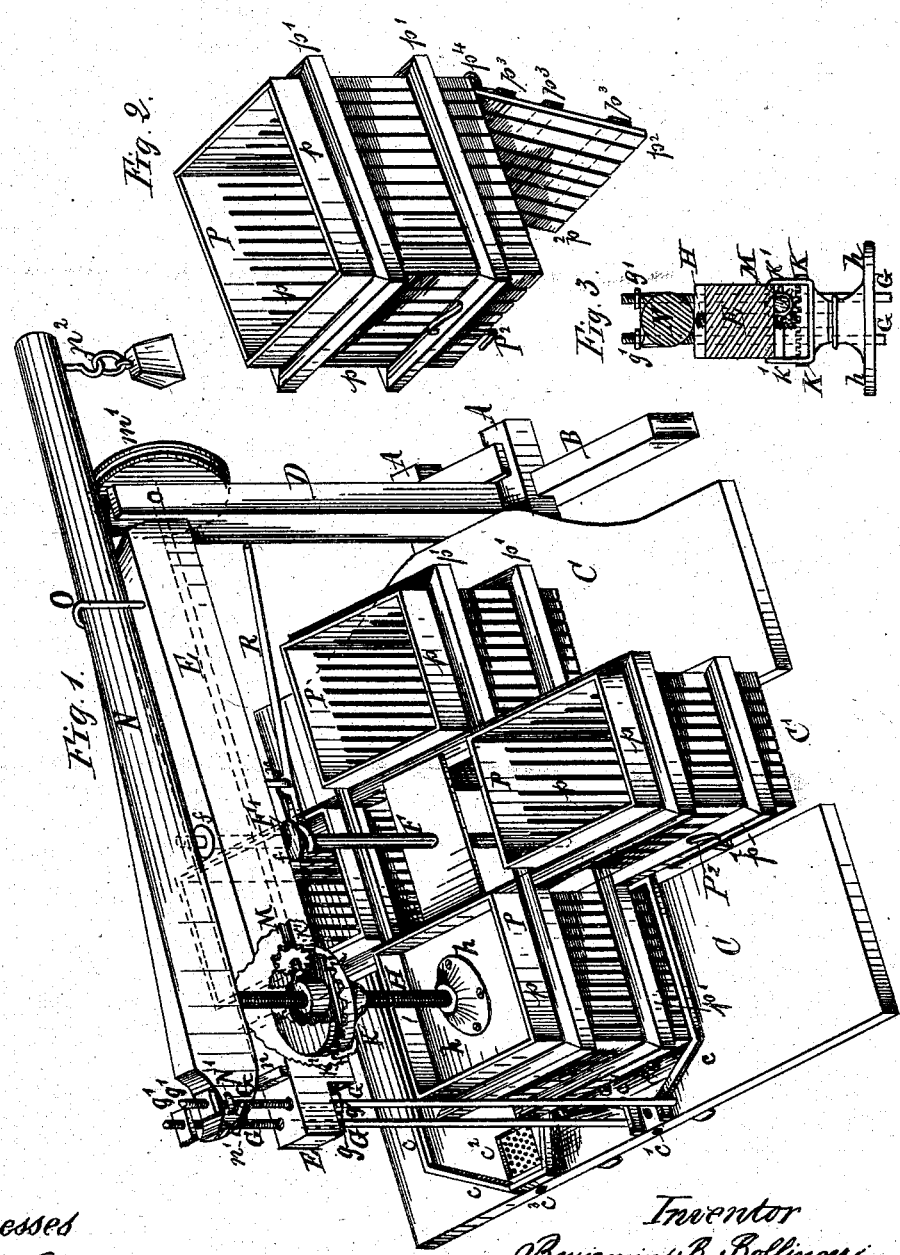
B. B. BOLLINGER.
CIDER AND WINE PRESSES.
No. 186,452. Patented Jan. 23, 1877.
Witnesses
Henry Orth
Inventor
Benjamin B. Bollinger
Abbott & Co attys

BENJAMIN B. BOLLINGER, OF LOUISVILLE, OHIO.

IMPROVEMENT IN CIDER AND WINE PRESSES.

Specification forming part of Letters Patent No. 186,452, dated January 23, 1877; application filed December 2, 1876.

*To all whom it may concern:*

Be it known that I, BENJAMIN B. BOLLINGER, of Louisville, in the county of Stark and State of Ohio, have invented certain new and useful Improvements in Cider and Wine Presses; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to certain improvements in presses for obtaining the juice from apples and other fruits, and consists of such a construction and arrangement of parts as to greatly facilitate the pressing, and the filling, moving, and emptying of the vats and the collection of the juice.

Figure 1 in the drawings is a perspective view of my improved press, with some of the parts broken away to clearly exhibit the construction and operation. Fig. 2 is a detached view of one of the vats. Fig. 3 is a detached view, partly in section, of the nut upon the screw-shaft.

The bottom frame of the machine consists of the sills A A and the transverse joists or sills B B. C represents the platform, attached to sills A and B. This platform is provided with ledges $c\ c$, projecting from its upper surface, and consisting of strips of wood, or other suitable material, fastened to the platform, and so located as to surround the bottom of the vat which is being pressed, and one or more of the others, thereby forming, with the platform C, a shallow trough or receiver for the juice. The juice is educted from said trough either over the edge of the platform by a spout or opening, $c^1$, or preferably through a screen, $c^2$, fastened upon the platform at one end of the trough, and communicating with an aperture, $c^3$. $c^4\ c^4$ are also ledges, projecting from the upper surface of the platform, to support the bottoms of the vats while pressure is being applied to their contents. On one side the platform C has an opening, C', large enough to allow the bottoms of the vats to freely drop upon their hinges. At one end of the bottom frame is attached the upright D, which is slotted at its upper end. The cross-beam E is tenoned at at one end, and the tenon is hinged in the slot in upright D. Through the center of the cross-beam E, and through the center of the platform, passes vertically the pivotal rod F, around which the vats revolve. The cross-beam is supported at its other end by means of two vertical rods, G G, whose distance from the pivotal rod F is equal, or nearly equal, to that of the upright D. These rods G G are attached to the platform, and pass through the end of the beam E, and are provided with screw-threads at their upper ends. Upon each of these threads there move two nuts, $g\ g'$, one below and one above the beam E. The nuts $g\ g$ support the end of the beam E. The nuts $g'\ g'$ are for a purpose hereinafter set forth. A vertical screw-shaft, H, having a platen or follower, $h$, at its lower end, passes through the beam E, between the supports G G and the pivotal rod F. Between the platen $h$ and the beam E a cylindrical nut, K, moves upon the thread of screw-shaft H. Upon the exterior surface of this nut K there is a cogged flange, $k$, which meshes with pinion $m$ upon the horizontal shaft M. Hangers $k'\ k'$, extending from the beam E, furnish a bearing for the nut K. Power is applied to the nut K by means of pulley $m'$, shaft M, and pinion $m$. A weighted lever, N, moving in the same vertical plane as the cross-beam E, rests upon a bolster, $n$, situated upon the upper side of beam E, between the screw-shaft H and the rods G G. The upper side of the short arm of the lever N bears against a link, N', which surrounds both of the rods G G, beneath the nuts $g'\ g'$. A pin or stud, $n^1$, projecting from the lateral faces of the lever, and situated outside of the rods G, prevents the lever from moving inward. The position of the fulcrum of the lever can be adjusted by means of the nuts $g'$. The longer arm of lever N passes through a loop or staple, O, which is fastened to the upper side of cross-beam E, near the upright D, and prevents the lever from swinging laterally and from rising too high. To the under side of the end of the longer arm of lever N a hook, $n^2$, is fastened, whereto sufficient weight may be attached to secure the requisite pressure. The vats or press-cribs P P P P each consist of vertical bars $p\ p$, or boards slotted vertically, which are contained within and are fastened to a series of horizontal frames made of bars $p^1\ p^1$. The bottom of each vat or crib is composed of horizontal slats $p^2\ p^2$, braced together by transverse bars $p^3\ p^3$, and is hinged to the lower end of one of the sides of the vat, as at $p^4$. $P^2$ represents a latch, by which the fastening and dropping of the bottom are readily manipulated.

The vats are fastened together horizontally by a suitable frame-work, so that their central vertical lines shall be equally distant from the pivotal rod F, around which they revolve. In order that the vats may freely revolve, it is necessary to raise them above the ledges $c\ c$ upon the platform. I accomplish this by means of the following devices: A sleeve, $F'$, passes vertically through, and is rigidly fastened to, the center of the frame-work which joins the vats. This sleeve moves upon the pivotal rod F, and has a circular flange or head, $f$, at its upper end. A forked lever, R, hinged to a loop, $r$, which is fastened to the under side of cross-beam E, bears against the under side of flange $f$, thereby enabling the operator to elevate the sleeve and with it the whole series of vats.

The operation of this press will be readily understood. A vat filled with the material to be pressed is moved around until it rests beneath the platen where pressure is applied by the screw. After the contents of the vat have been sufficiently pressed, it is then swung around until it is over the opening $C'$ in the platform. It is here unlatched and emptied, the bottom automatically dropping on its hinges from the weight of the contained material.

It is manifest that when pomace is pressed by a screw working against a stationary bar above, the pressure decreases after the motion of the screw ceases. This arises from the subsequent escape of juice from the vat, which reduces the compressed bulk and interferes with thorough exhaustion. By the weighted lever N I am enabled to obviate this difficulty, and preserve a constant pressure for any length of time.

What I claim is—

1. In a cider-press, a vat or press-crib having a hinged bottom, substantially as set forth.

2. In a cider-press, two or more vats moving around a common center and rigidly connected together by a single frame-work, in combination with a fixed platform, substantially as set forth.

3. In a cider-press, two or more revolving vats, with the mechanism for elevating them above obstructions upon a fixed platform, substantially as set forth.

4. In a cider-press, a weighted cross-beam swinging vertically upon a hinge, in combination with a press-screw shaft working against said beam, with mechanism for rotating the shaft, substantially as set forth.

5. In a cider-press, a hinged cross-beam swinging vertically, and a press-screw shaft provided with mechanism for rotating it against said beam, in combination with a weighted lever bearing upon said beam, substantially as set forth.

In testimony that I claim the foregoing as my own I affix my signature in presence of two witnesses.

BENJAMIN B. BOLLINGER.

Witnesses:
GEO. W. RAFF,
PERCY S. SOWERS.